Patented Mar. 26, 1929.

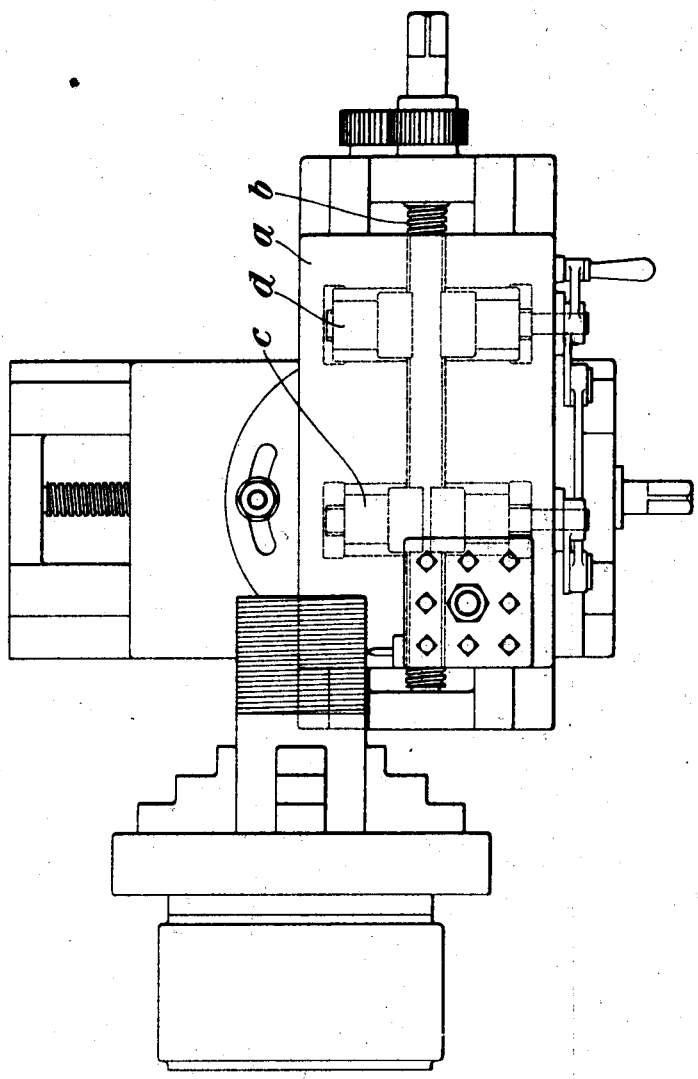

1,706,763

UNITED STATES PATENT OFFICE.

JOHANNES WILBERZ, OF HILDEN, GERMANY.

FEED-SCREW MECHANISM FOR LATHES.

Application filed February 18, 1927, Serial No. 169,364, and in Germany November 16, 1926.

The cutting of threads on lathes is normally done by the use of a threaded spindle, and the degree of accuracy of the thread to be cut depends principally on the accuracy of said spindle. Therefore, particular attention is paid to the production of accurate threaded spindles for lathes. In operation, the threaded spindles are, however, subject to more or less wear and tear, this latter being different on different parts of the spindle according, or in proportion to, the strain to which the respective parts of the spindle have been subjected. Defects in the pitch of a worn-out spindle are, of course, transmitted to the thread that is being cut.

In order to obviate this disadvantage, machine tools on which threads are to be cut, have been provided with a threaded spindle for the exclusive purpose of cutting threads, while the turning is effected by the use of a feed rod actuated by means of gearing and a rack provided under the lathe bed. Machines are also made, that have two threaded spindles, one to be used for cutting threads and the other for turning-work.

In both cases the double equipment makes the machines decidedly more expensive and increases their dimensions.

When using the double equipment the guidance of the tool carrier is unfavorably influenced, inasmuch as the point of attack of the power is transposed vertically to the direction of movement.

The invention overcomes these disadvantages and drawbacks, as the guide spindle can be coupled at different points with the tool carrier, so that for each operation (turning-off or thread cutting) only a certain part of the guide spindle is used.

In the accompanying drawing one form of the invention is illustrated diagrammatically and by way of example in a plan view.

The carriage $a$ has two clasp nuts $c$ and $d$, so arranged that they can be alternately coupled with the guide spindle $b$. Accordingly, when the carriage is coupled with the spindle $b$, by means of either of the clasp nuts $c$ or $d$, the spindle is working only with one or the other portion, so that for a certain operation only a certain portion of the spindle is active. It is clear that by means of the invention the increased cost, as well as the increased dimensions, due to the provision of a second spindle are avoided.

The aforesaid faults in the guidance of the tool carrier are entirely done away with, as the single spindle of the invention can be properly arranged. By the alternate use of both nuts, the acting point of force is transposed solely into the direction of movement.

The invention is particularly suited for such machines which have a short guide spindle, for instance turret lathes, lathes for chuck work, and pipe threading lathes. A further advantage is, that the invention can be attached subsequently to numerous machines in a very simple manner.

I claim:

1. In a guide-spindle lathe, the combination of a tool carriage with a single-thread spindle, nuts mounted on the carriage and spaced apart thereon to traverse the spindle adjacent to the opposite ends thereof, each of said nuts comprising complementary members and mechanism for clamping said members together on the spindle, and operative means common to the clamping mechanism of both nuts.

2. In a guide-spindle lathe, the combination of a tool carriage with a single-thread spindle, nuts mounted on the carriage and spaced apart thereon to traverse the spindle adjacent to the opposite ends thereof, each of said nuts comprising complementary members and mechanism for clamping said members together on the spindle, and a common actuating mechanism connected with the clamping mechanisms of both nuts and operative to actuate said mechanisms simultaneously to clamp one of the nuts on the spindle and to disengage the other nut from the spindle.

In witness whereof I have hereunto set my hand.

JOHANNES WILBERZ.